US011153776B2

(12) United States Patent
Zheng et al.

(10) Patent No.: US 11,153,776 B2
(45) Date of Patent: Oct. 19, 2021

(54) USER EQUIPMENT ASSISTED PACKET ROUTING AT A BASE STATION

(71) Applicants: Ruiming Zheng, Beijing (CN); Xipeng Zhu, San Diego, CA (US); Huichun Liu, Beijing (CN); Qualcomm Incorporated, San Diego, CA (US)

(72) Inventors: Ruiming Zheng, Beijing (CN); Xipeng Zhu, San Diego, CA (US); Huichun Liu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 44 days.

(21) Appl. No.: 16/500,763

(22) PCT Filed: Mar. 26, 2018

(86) PCT No.: PCT/CN2018/080443
§ 371 (c)(1),
(2) Date: Oct. 3, 2019

(87) PCT Pub. No.: WO2018/201820
PCT Pub. Date: Nov. 8, 2018

(65) Prior Publication Data
US 2020/0229021 A1 Jul. 16, 2020

(30) Foreign Application Priority Data
May 4, 2017 (WO) ............... PCT/CN2017/083074

(51) Int. Cl.
*H04W 28/02* (2009.01)
*H04W 76/12* (2018.01)
(Continued)

(52) U.S. Cl.
CPC ....... *H04W 28/0263* (2013.01); *H04W 76/12* (2018.02); *H04W 80/02* (2013.01); *H04W 80/08* (2013.01); *H04W 88/16* (2013.01)

(58) Field of Classification Search
CPC combination set(s) only.
See application file for complete search history.

(56) References Cited

U.S. PATENT DOCUMENTS

| 2013/0018937 A1* | 1/2013 | Kim ................... G06F 16/9574 709/202 |
| 2013/0132544 A1 | 5/2013 | Krishnan et al. |
| 2016/0337919 A1* | 11/2016 | Bindrim ................ H04L 67/289 |

FOREIGN PATENT DOCUMENTS

| CN | 103581248 A | 2/2014 |
| CN | 106131114 A | 11/2016 |

(Continued)

OTHER PUBLICATIONS

International Search Report and Written Opinion—PCT/CN2017/083074—ISA/EPO—dated Jan. 11, 2018.
(Continued)

*Primary Examiner* — Fahmida S Chowdhury

(57) ABSTRACT

Wireless communications systems as described herein may be configured to provide user equipment (UE) assisted information for caching data at a network node external to a core network (CN). In some cases, the UE may provide an acceleration indicator (AI) that a base station may receive and identify as caching information. The base station, upon identifying that the AI is present in an uplink packet, may transmit the packet to a gateway having a local cache. If the uplink packet does not have an AI, the base station may route the uplink packet according to an address (e.g., a uniform resource locator (URL)) contained in the packet.

29 Claims, 12 Drawing Sheets

(51) Int. Cl.
  *H04W 80/02* (2009.01)
  *H04W 80/08* (2009.01)
  *H04W 88/16* (2009.01)

(56) References Cited

FOREIGN PATENT DOCUMENTS

| EP | 2938046 A1 | 10/2015 |
|---|---|---|
| WO | WO-2017020270 A1 | 2/2017 |

OTHER PUBLICATIONS

International Search Report and Written Opinion—PCT/CN2018/080443—ISA/EPO—dated Jun. 15, 2018.
Catt: "Considerations on Context Aware Service Delivery", 3GPP Draft, 3GPP TSG RAN WG3#91 bis, R3-160769, 3rd Generation Partnership Project (3GPP), Mobile Competence Centre, 650, Route Des Lucioles, F-06921 Sophia-Antipolis Cedex, France, vol. RAN WG3, No. Bangalore, India, Apr. 11, 2016-Apr. 15, 2016, Apr. 2, 2016 (Apr. 2, 2016), XP051083027, 3 pages, Retrieved from the Internet: URL: http://www.3gpp.org/ftp/tsg_ran/WG3_Iu/TSGR3_91bis/Docs/. [retrieved on Apr. 2, 2016] the whole document*.
CMCC Qualcomm Incorporated: "Solution to Backhaul Long Latency Issue", 3GPP Draft, 3GPP TSG RAN WG3 #94, R3-162886, Solution to Backhaul Long Latency Issue, 3rd Generation Partnership Project (3GPP), Mobile Competence Centre, 650, Route Des Lucioles, F-06921 Sophia-Antipolis Cedex, France, vol. RAN WG3, No. Reno, Nevada, USA, Nov. 14, 2016-Nov. 18, 2016, Nov. 14, 2016 (Nov. 14, 2016), XP051178985, 6 pages, Retrieved from the Internet: URL: http://www.3gpp.org/ftp/Meetings_3GPP_SYNC/RAN3/Docs/. [retrieved on Nov. 14, 2016] the whole document*.
Qualcomm Incorporated: "UE Assisted Local Caching", 3GPP Draft, GPP TSG-RAN WG3 Meeting #95bis, R3-171245, UE Assisted Local Caching, 3rd Generation Partnership Project (3GPP), Mobile Competence Centre, 650, Route Des Lucioles, F-06921 Sophia-Antipolis Cedex, France, vol. RAN WG3, No. Spokane, USA, Apr. 3, 2017-Apr. 7, 2017, Apr. 3, 2017 (Apr. 3, 2017), XP051245955, 6 pages, Retrieved from the Internet: URL: http://www.3gpp.org/ftp/Meetings_3GPP_SYNC/RAN3/Docs/. [retrieved on Apr. 3, 2017] the whole document.
Supplementary European Search Report—EP18795183—Search Authority—Munich—dated Oct. 12, 2020.
Qualcomm Incorporated; "UE Based Context-aware and Selective Service Acceleration"; 3GPP TSG-RAN WG3 Meeting #93bis R3-161678, Aug. 13, 2016 (Aug. 13, 2016); 6 pgs.
Taiwan Search Report—TW107111624—TIPO—dated Jun. 17, 2021.

* cited by examiner

USER EQUIPMENT ASSISTED PACKET ROUTING AT A BASE STATION

CROSS REFERENCES

The present Application is a 371 national phase filing of International Patent Application No. PCT/CN2018/080443 by Zheng et. al., entitled "USER EQUIPMENT ASSISTED PACKET ROUTING AT A BASE STATION," filed Mar. 26, 2018; and to International Patent Application No. PCT/CN2017/083074 to Zheng et. al., entitled "USER EQUIPMENT ASSISTED PACKET ROUTING AT A BASE STATION," filed May 4, 2017, each of which is assigned to the assignee hereof which is hereby incorporated by reference in their entirety.

INTRODUCTION

The following relates generally to wireless communication, and more specifically to user equipment assisted packet routing at a base station.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, each of which may be otherwise known as a user equipment (UE).

Content delivery networks (CDNs) are network configurations that may be used to push desired content (e.g., media of various types) to the nodes closest to the requesting users. This is done to reduce the traffic load on the backhaul links of the given network and speed up access times for the requesting users. When the network involves a mobile network, a CDN may cache content close to an edge router (e.g., a packet gateway (PGW) in an LTE system, a user plane function (UPF) in a 5G or NR system, or a gateway GPRS support node (GGSN) in a 3G or universal mobile telecommunications service (UMTS) network) of one or more UEs. In some cases, a base station or component of a core network (CN) of a wireless communications system may cache certain content for delivery to UEs, which may be referred to as mobile-CDN. Having a component of the CN cache data may add complexity to the CN, but may also reduce latency in providing data to UEs and may in some cases provide a source of revenue for a wireless communications system operator.

SUMMARY

A method of wireless communication is described. The method may include receiving, at a base station, an uplink packet from a UE, the base station located within a CN of a wireless communication system, identifying an AI in the uplink packet, and routing the uplink packet to a first gateway based at least in part on the AI, wherein the first gateway is external to the CN and has a local cache that stores data responsive to a data request included in the uplink packet.

An apparatus for wireless communication is described. The apparatus may include means for receiving, at a base station, an uplink packet from a UE, the base station located within a CN of a wireless communication system, means for identifying an AI in the uplink packet, and means for routing the uplink packet to a first gateway based at least in part on the AI, wherein the first gateway is external to the CN and has a local cache that stores data responsive to a data request included in the uplink packet.

Another apparatus for wireless communication is described. The apparatus may include a processor, memory in electronic communication with the processor, and instructions stored in the memory. The instructions may be operable to cause the processor to receive, at a base station, an uplink packet from a UE, the base station located within a CN of a wireless communication system, identify an AI in the uplink packet, and route the uplink packet to a first gateway based at least in part on the AI, wherein the first gateway is external to the CN and has a local cache that stores data responsive to a data request included in the uplink packet.

A non-transitory computer readable medium for wireless communication is described. The non-transitory computer-readable medium may include instructions operable to cause a processor to receive, at a base station, an uplink packet from a UE, the base station located within a CN of a wireless communication system, identify an AI in the uplink packet, and route the uplink packet to a first gateway based at least in part on the AI, wherein the first gateway is external to the CN and has a local cache that stores data responsive to a data request included in the uplink packet.

In some examples of the method, apparatus, and non-transitory computer-readable medium described above, the first gateway may be a local gateway having the local cache and wherein the AI indicates that the uplink packet may be to be routed to the local gateway.

In some examples of the method, apparatus, and non-transitory computer-readable medium described above, the routing the uplink packet may be based on a value of the AI and may be performed independently of an IP address or a TFT included in the uplink packet.

Some examples of the method, apparatus, and non-transitory computer-readable medium described above may further include processes, features, means, or instructions for determining that an IP address or a TFT included in the uplink packet corresponds to an IP address or TFT associated with a CN cache located within the CN. Some examples of the method, apparatus, and non-transitory computer-readable medium described above may further include processes, features, means, or instructions for transmitting a content request based at least in part on information contained in the uplink packet to the CN cache.

In some examples of the method, apparatus, and non-transitory computer-readable medium described above, the AI may be included in a PDCP header of the uplink packet. In some examples of the method, apparatus, and non-transitory computer-readable medium described above, the AI may be included in a RLC header or a MAC CE of the uplink packet. In some examples of the method, apparatus, and non-transitory computer-readable medium described above, the AI comprises a bit field in the uplink packet that indicates the uplink packet may be for a data service that may be configured for local caching at the first gateway, or indicates a service type associated with the uplink packet.

Some examples of the method, apparatus, and non-transitory computer-readable medium described above may further include processes, features, means, or instructions for determining that the AI indicates the uplink packet may be to be routed to the first gateway, wherein the first gateway may be a local gateway having the local cache that stores data responsive to the data request included in the uplink packet. Some examples of the method, apparatus, and non-transitory computer-readable medium described above may further include processes, features, means, or instructions for generating GTP-U packet based at least in part on information from the uplink packet. Some examples of the method, apparatus, and non-transitory computer-readable medium described above may further include processes, features, means, or instructions for routing the GTP-U packet with the AI to the local cache.

In some examples of the method, apparatus, and non-transitory computer-readable medium described above, the first gateway corresponds to a TOF of the CN. In some examples of the method, apparatus, and non-transitory computer-readable medium described above, the first gateway corresponds to a local UPF and the second gateway corresponds to a macro UPF.

DETAILED DESCRIPTION

Wireless communications systems as described herein may be configured to provide a user equipment (UE) assisted information for caching data at a network node external to a core network (CN). In some cases, the UE may provide an acceleration indicator (AI) that a base station may receive and identify as caching information. The base station, upon identifying that the AI is present in an uplink packet, may transmit the packet to a gateway having a local cache. If the uplink packet does not have an AI, the base station may route the uplink packet according to an address (e.g., a uniform resource locator (URL)) contained in the packet.

In some cases, content associated with a particular data service (e.g., a data service that provides video content to a UE) may be associated with the AI, and a base station may configure the UE to set the AI for uplink packets of the service. In some cases, a base station may be aware that a particular service has data cached as a local gateway and may identify an uplink packet from a UE is associated with the service. The base station may then route the uplink packet to the local cache at the local gateway responsive to identifying the uplink packet as being associated with the service. In some cases, the base station may route the uplink packet based on a value of the AI irrespective of an Internet Protocol (IP) address or a traffic flow template (TFT) of the uplink packet. In some cases, the base station may also do a deep packet inspection (DPI) of the uplink packet, and may provide data that is cached internally to the CN if the DPI indicates that such data is cached internally to the CN. In some cases, the gateway corresponds to a traffic offload function (TOF) of the CN. In some cases, the gateway corresponds to a local user plane function (UPF) and a different gateway corresponds to a macro UPF.

Aspects of the disclosure are initially described in the context of a wireless communications system. Aspects of the disclosure are further illustrated by and described with reference to apparatus diagrams, system diagrams, and flowcharts that relate to user equipment assisted packet routing at a base station.

Figure 1:
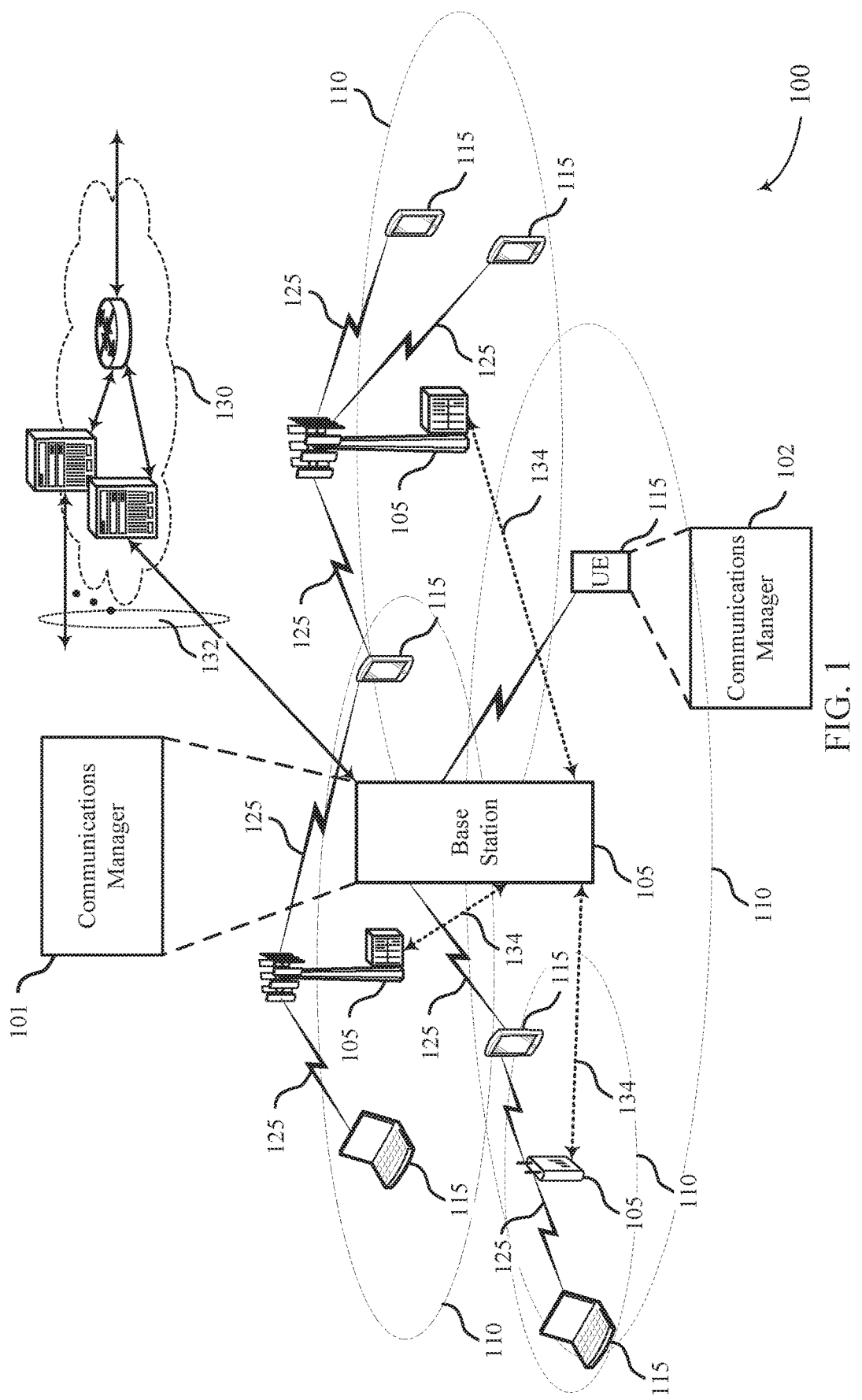
FIG. 1 illustrates an example of a system for wireless communication that supports user equipment assisted packet routing at a base station in accordance with aspects of the present disclosure.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE), LTE-Advanced (LTE-A) network, or a New Radio (NR) network. In some cases, wireless communications system 100 may support enhanced broadband communications, ultra-reliable (i.e., mission critical) communications, low latency communications, and communications with low-cost and low-complexity devices. One or more UEs 115 in the wireless communications system 100 may be configured to provide UE assistance information for local caching, which a base station 105 may receive and use to route uplink packets from the UEs 115.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of Things (IoT) device, an Internet of Everything (IoE) device, a machine type communication (MTC) device, an appliance, an automobile, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communications system may be configured to provide ultra-reliable communications for these functions.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as evolved NodeBs (eNBs) 105.

A base station 105 may be connected by an S1 interface to the core network 130. The core network may be an evolved packet core (EPC), which may include at least one mobility management entity (MME), at least one serving gateway (S-GW), and at least one Packet Data Network (PDN) gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions, such as providing uplink packets to a gateway having a local cache based on an AI included in an uplink packet from a UE 115. The P-GW may be connected to the network operators IP services. The operators IP services may include the Internet, the Intranet, an IP Multimedia Subsystem (IMS), and a Packet-Switched (PS) Streaming Service.

The core network 130 may provide user authentication, access authorization, tracking, Internet Protocol (IP) connectivity, routing for local caching, and other access, routing, or mobility functions. At least some of the network devices, such as base station 105-a may include subcomponents such as an access network entity, which may be an example of an access node controller (ANC). Each access network entity may communicate with a number of UEs 115 through a number of other access network transmission entities, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105). The base stations 105 may include ground-based infrastructure required for delivery of communication between UEs 115 and the core network, and in some cases may be referred to collectively as a radio access network (RAN).

One or more of base stations 105 may include a communications manager 101, which may receive uplink packets from a UE 115, identify an AI in the uplink packet, and route the uplink packet to a first gateway based at least in part on the AI. The first gateway may be external to the core network 130 and have a local cache that stores data responsive to a data request included in uplink packets that have an AI that is set to indicate that the packet is to be routed to the first gateway. In some cases, a second gateway external to the core network 130 may provide IP routing based on a URL contained in the uplink packet in the event that the AI indicator is not set.

UEs 115 may include a communications manager 102, which may generate an uplink packet and set an AI of the uplink packet based on a service associated with an uplink packet. The AI may indicate to a base station 105 that the uplink packet is to be routed to the first gateway with the locally cached data that may be responsive to the uplink packet, or that the uplink packet is to be routed through the second gateway for IP routing.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid ARQ (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105, or core network 130 supporting radio bearers for user plane data. At the Physical (PHY) layer, transport channels may be mapped to physical channels.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

A shared radio frequency spectrum band may be utilized in an NR shared spectrum system. For example, an NR shared spectrum may utilize any combination of licensed, shared, and unlicensed spectrums, among others. In some examples, NR shared spectrum may increase spectrum utilization and spectral efficiency, specifically through dynamic vertical (e.g., across frequency) and horizontal (e.g., across time) sharing of resources.

In some cases, wireless system 100 may utilize both licensed and unlicensed radio frequency spectrum bands. For example, wireless system 100 may employ LTE License Assisted Access (LTE-LAA) or LTE Unlicensed (LTE U) radio access technology or NR technology in an unlicensed band such as the 5 Ghz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a CA configuration in conjunction with CCs operating in a licensed band. Operations in unlicensed spectrum may include downlink transmissions, uplink transmissions, or both. Duplexing in unlicensed spectrum may be based on frequency division duplexing (FDD), time division duplexing (TDD) or a combination of both.

Figure 2:
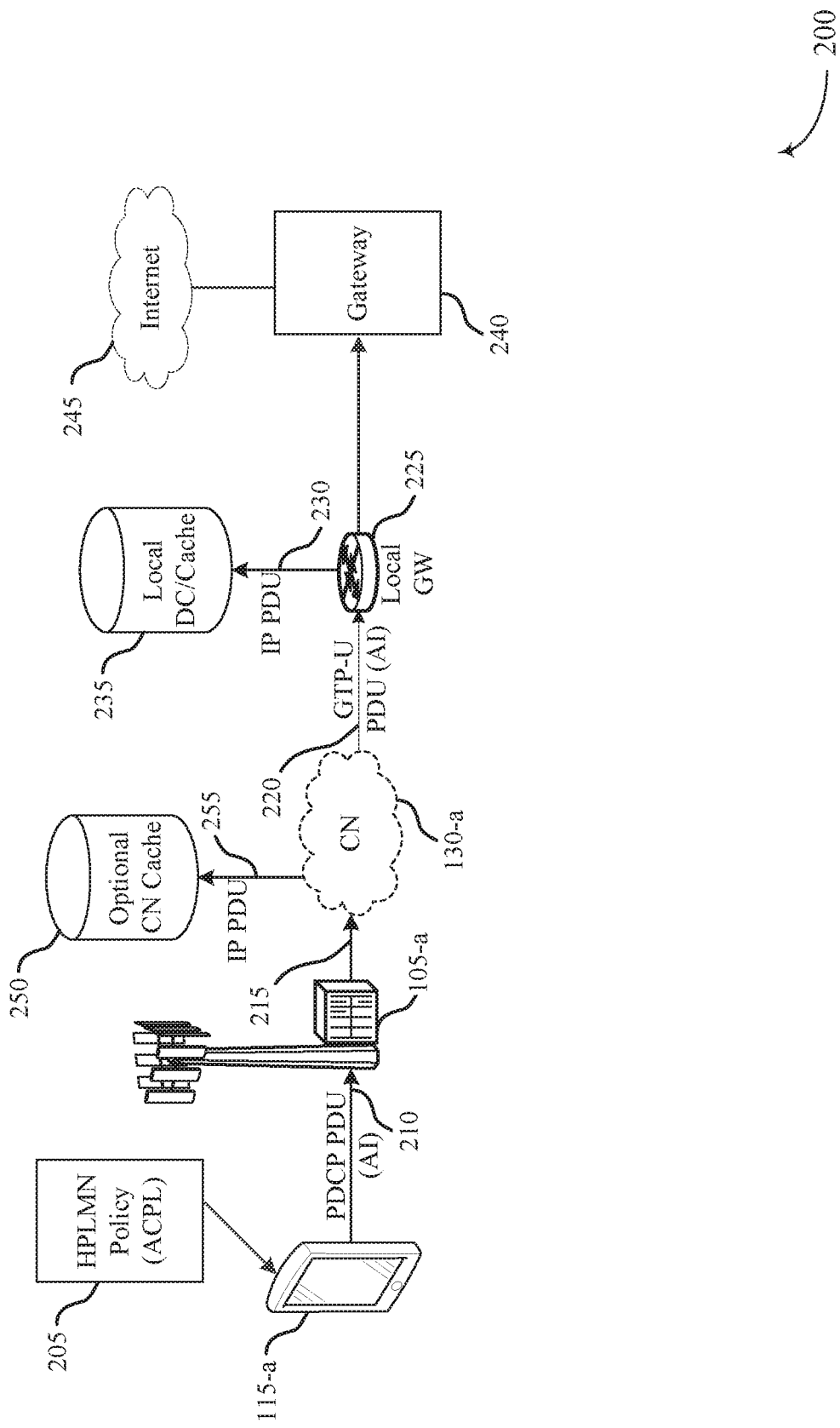
FIG. 2 illustrates an example of a wireless communication system interconnected with a data network that supports user equipment assisted packet routing at a base station in accordance with aspects of the present disclosure.

FIG. 2 illustrates an example of a wireless communication system 200 interconnected with a data network that supports user equipment assisted packet routing at a base station in accordance with various aspects of the present disclosure. In some examples, wireless communication system 200 may implement aspects of wireless communication system 100.

In this example, a UE 115-a may have an established connection with a base station 105-a. In some cases, the UE 115-a may be configured with a home public land mobile network (HPLMN) policy which may include an authorized content provider list (ACPL) that may include URL information. In some cases, the HPLMN policy and/or the ACPL may indicate that certain uplink packets from the UE 115-a are to include an AI. In some examples, the UE 115-a may receive signaling (e.g., RRC signaling) from the base station to configure certain services to include an AI, while one or more other services may not include an AI. The UE 115-a may transmit a PDCP PDU 210 that includes an indication that AI is set for the packet. The base station 105-a, alone or in conjunction with the CN 130-a (e.g., a SGW or PGW within the CN 130-a) may receive the PDCP PDU 210 and identify whether the AI is set or not, and route the packet through the CN 130-a to a local gateway 225 based on whether the AI is set.

The local gateway 225 may have a local data content (DC) or local cache 235 that may include data that is responsive to data to be provided in response to the uplink packet from the UE 115-a. The local gateway 225 may thus be external to the CN 130-a, and the uplink packet may be routed to the local DC/cache 235 through a GPRS tunneling protocol user plane (GTP-U) packet 220. The local gateway 225 may identify the GTP-U packet 220 and route an IP PDU 230 to the local DC/cache 235 to obtain data responsive to the uplink packet. If the AI in the uplink packet is not set, the base station 105-a, alone or in conjunction with CN 130-a, may route the uplink packet using a URL through the local gateway 225 to an Internet gateway 240. The Internet gateway 240 may route the packet according to an internet protocol to the internet 245.

In some cases, the CN 130-a may optionally also have its own local DC/cache, referred to as CN cache 250. In such cases, if the uplink packet does not have an AI set, the base station 105-a, alone or in conjunction with CN 130-a, may perform a deep packet inspection (DPI) in which the uplink packet may be inspected (e.g., for a destination URL) to determine if responsive data may be present in the CN cache. If it is determined that the CN cache 250 may have data responsive to the uplink packet, the base station 105-a and/or CN 130-a may route the uplink packet to the CN cache 250 in an IP PDU 255. In cases where the optional CN cache 250 is present, the network 200 may include caching both internal to the CN 130-a and external to the CN 130-a, which may be referred to as below the local gateway 225 or above the local gateway 225, respectively.

As indicated above, in some cases the UE 115-a may provide information in uplink packets that may be used to determine if responsive data is present in local DC/cache 235 or in CN cache 250. Such information provided by the UP 115-a, which may be referred to as AI information, may provide UE assisted caching, which may reduce an amount of DPI that the base station 105-a may have to perform, which in turn may enhance the efficiency of the base station 105-a. When using the CN cache 250, the base station 105-e may configure (e.g., using RRC signaling) the UE with information that may be used to determine whether the CN cache 250 may have data responsive to the uplink packet. In some cases, the base station 105-a, alone or in conjunction with other components of CN 130-a may configure the UE 115-a with a service information list (e.g., the ACPL) which indicates the service characteristics that it supports and can be provided by the CN cache 250. The UE 115-a may initiate a content request, generate an AI (e.g., an acceleration indicator, assistance information, or service type) based on the service information list and encapsulate the indicator into uplink signalling. The base station 105-a may processes the uplink signal and concurrently acquire the service information that UP 115-a requested, and reply, where the base station 105-a or CN 130-a may decide whether the content request should be sent to the CN cache 250 or not.

In cases where UP 115-a assisted local caching is provided above the edge gateway of the CN 130-a, or externally to the CN 130-a, the base station 105-a may configure the UE 115-a (e.g., via RRC signaling) to use an AI for certain uplink packets. Such caching externally of the CN 130-a may logically have less impact to existing network architecture and RAN/CN function split. In some cases, a Traffic Offload Function (TOF) may branch user traffic to local breakout (i.e., local GW 225) and to macro GW (i.e. GW 240), which may be a user plane function (UPF) in a NR or 5G network. In some cases, a NR or 5G network may support multi-home PDU session, which typically has a local UPF and a macro UPF, and the TOF may be implemented as a local UPF. In some cases, the term local gateway may be used for the TOF.

When performing caching external to the CN 130-a, the UE 115-a may generate an AI, which may be a bit or flag that may be set or cleared, assistance information, or an indication of a service type of an uplink packet. The AI may be generated based on the service information list and may encapsulate the indicator into uplink signalling. For an uplink PDU with AI set by the UE 115-a, the base station 105-a may relay the AI in a GTP-U header in a PDU provided to the Local GW 225. The local GW 225 may then route payload of the GTP-U PDU with AI to local DC/cache 235. Thus, the local GW 225 may route the GTP-U PDU packet based on AI information, and not based on an IP filter or traffic flow template TFT. Additionally, the external local caching may be provided alone or in conjunction with CN cache 250 operation that is internal to the CN 130-a.

In some examples, the AI may be included in a PDCP header of an uplink packet. It is also possible to include the AI in other layer 2 protocols, such as in an RLC header, or a MAC control element (MAC CE). In some cases, as indicated above, the AI may be supported in other forms, such as a service type indicating the uplink packet is for the type of service eligible for local caching.

Local caching as discussed in various examples here may be useful in reducing the backhaul cost of a network operator, and may also improve the QoE of video streaming. Such UE assisted local caching may provide a relatively efficient solution to achieve caching to the edge for both 5G and 4G networks, and in some cases, may be extended to caching for other protocols, such as FTP by FTP proxy in the UE 115-a and base station 105-a.

Figure 3:
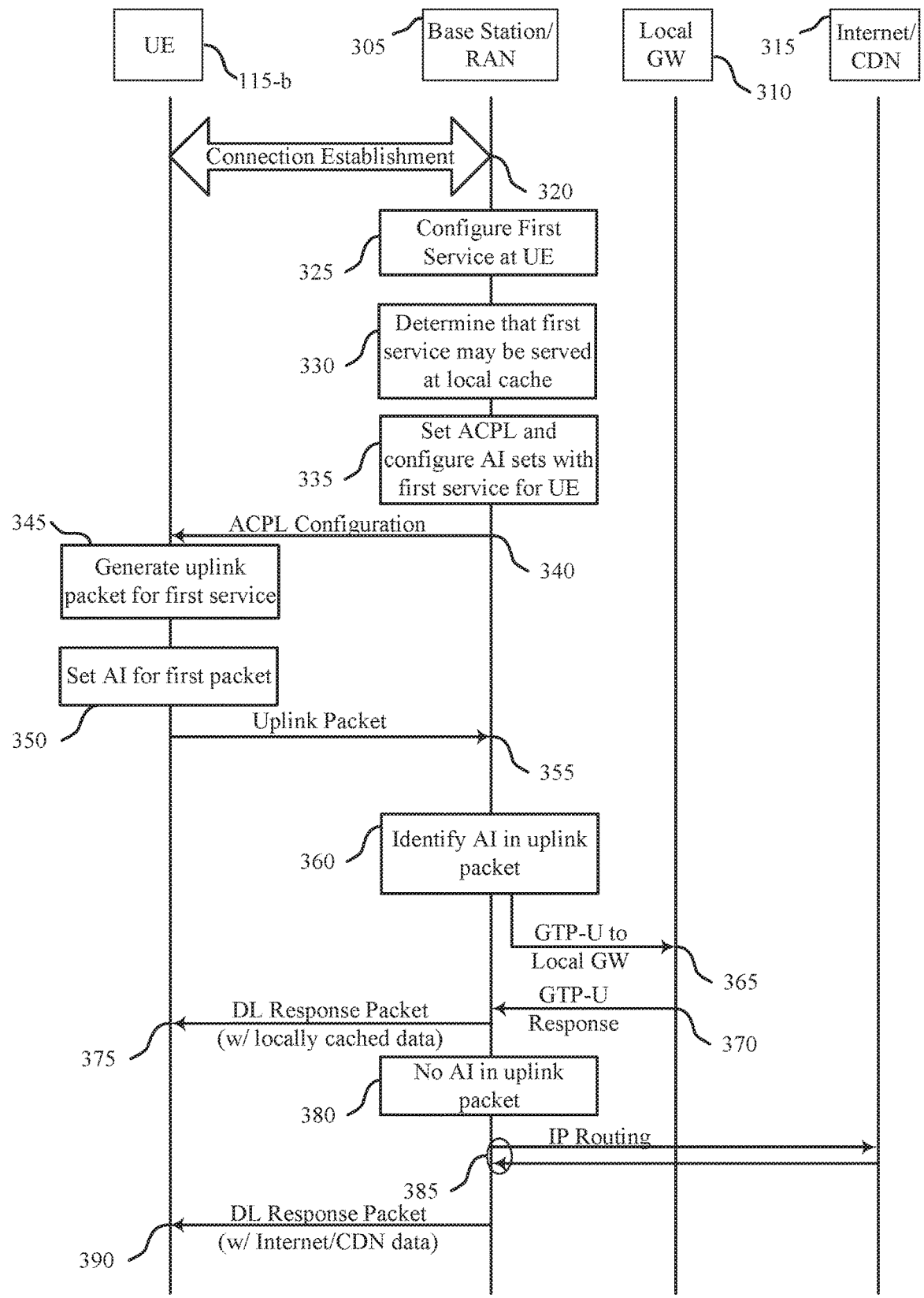
FIG. 3 illustrates an example of a process flow that supports user equipment assisted packet routing at a base station in accordance with aspects of the present disclosure.

FIG. 3 illustrates an example of a process flow 300 that supports user equipment assisted packet routing at a base station in accordance with various aspects of the present disclosure. In some examples, wireless communication system 300 may implement aspects of wireless communication system 100. In the example of FIG. 3, a UE 115-b, a base station/RAN 305, a local GW 310, and an Internet/CDN 315 may perform various functions for data content delivery.

The UE 115-b and base station/RAN 305 may establish a connection 320, according to established wireless connection establishment techniques. At block 325, the base station/RAN 305 may configure a first service at the UE 115-b. In some cases, the first service may be a video content delivery service, for example.

At block 330, the base station/RAN 305 may determine that the first service may be served by a local cache. In some cases, the local cache may be associated with the local GW 310 that may be external to the base station/RAN 305. The local cache may be located, for example, relatively close to the base station/RAN 305 and thus may have reduced backhaul costs compared to serving data associated with the first service through the Internet/CDN 315.

At block 335, the base station/RAN 305 may set an authorized content provider list (ACPL) and configure associated AI sets that include the first service for the UE 115-b. The base station/RAN 305 may transmit an ACPL configuration 340 to the UE 115-b, such as through RRC signaling, for example.

At block 345, the UE 115-b may generate an uplink packet for the first service. At block 350, the UE 115-b may set the AI for the uplink packet based on the first service, and the configuration of the first service by the base station/RAN 305. The UE 115-b may then transmit the uplink packet 355 to the base station/RAN 305.

The base station/RAN 305 may receive the uplink packet and identify a value of the AI. If the AI value indicates local caching for the service of the uplink packet, the base station/RAN 305 may transmit a GTP-U packet 365 to the local GW 310. The local GW 310 may provide GTP-U response 370 that may include data responsive to the uplink packet to the base station/RAN 305, which may in turn transmit a downlink response packet 375 with the locally cached data to the UE 115-b.

At block 380, the base station/RAN 305 may determine that the AI is not present in the uplink packet. The base station/RAN 305 may then initiate IP routing 385 with Internet/CDN 315, based on routing information and a URL in the uplink packet. The base station/RAN 305 may then transmit a downlink response packet 390 to the LTE 115-b with the Internet/CDN data.

Figure 4:
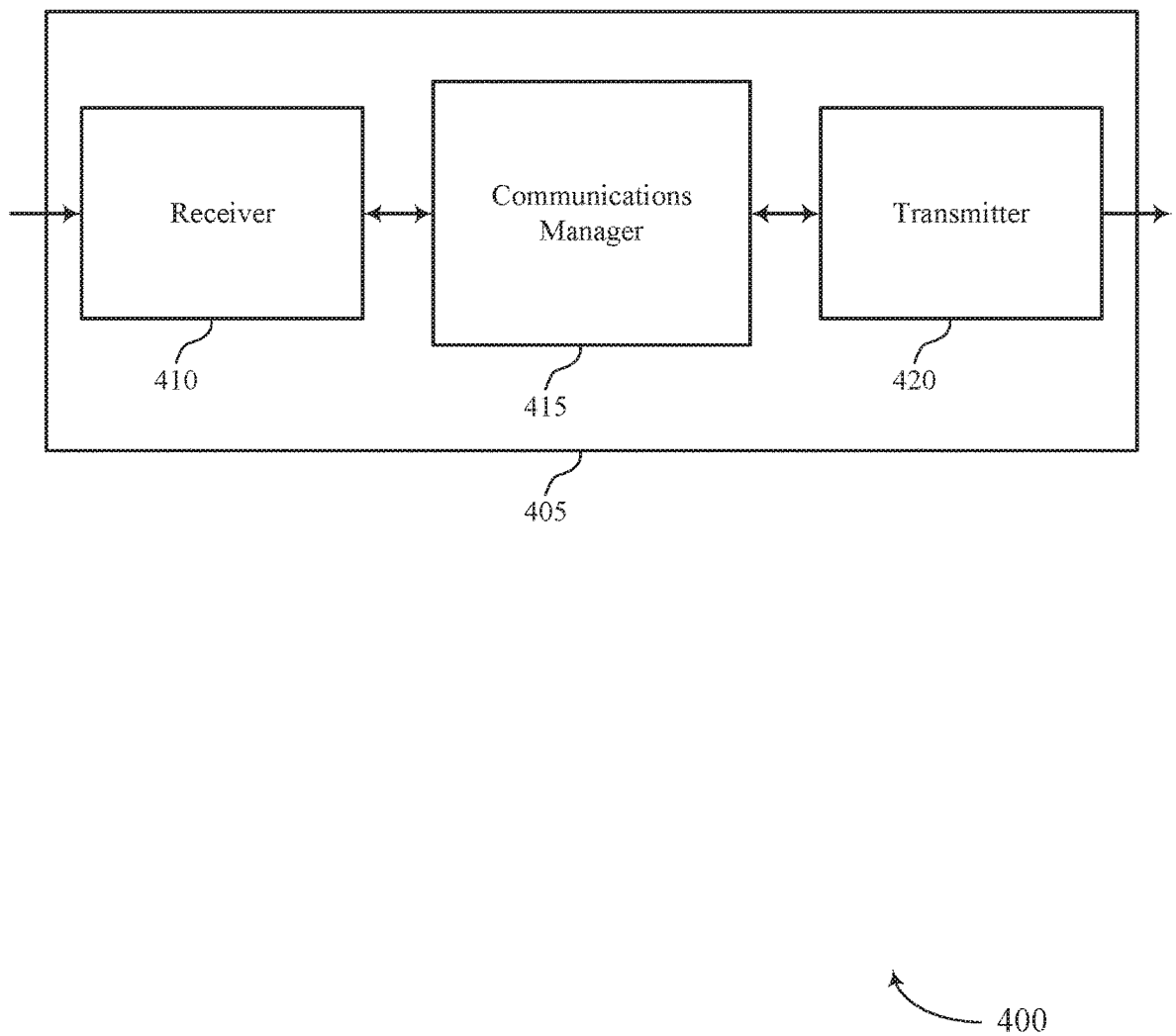
FIGS. 4 through 6 show block diagrams of a device that supports user equipment assisted packet routing at a base station in accordance with aspects of the present disclosure.

FIG. 4 shows a block diagram 400 of a wireless device 405 that supports user equipment assisted packet routing at a base station in accordance with aspects of the present disclosure. Wireless device 405 may be an example of aspects of a base station 105 as described herein. Wireless device 405 may include receiver 410, communications manager 415, and transmitter 420. Wireless device 405 may also include a processor. Each of these components may be in communication with one another (e.g., via one or more buses).

Receiver 410 may receive information such as packets, user data, or control information associated with various information channels (e.g., control channels, data channels, and information related to user equipment assisted packet routing at a base station, etc.). Information may be passed on to other components of the device. The receiver 410 may be an example of aspects of the transceiver 735 described with reference to FIG. 7. The receiver 410 may utilize a single antenna or a set of antennas.

Communications manager 415 may be an example of aspects of the communications manager 715 described with reference to FIG. 7.

Communications manager 415 and/or at least some of its various sub-components may be implemented in hardware, software executed by a processor, firmware, or any combination thereof. If implemented in software executed by a processor, the functions of the communications manager 415 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The communications manager 415 and/or at least some of its various sub-components may be physically located at various positions, including being distributed such that portions of functions are implemented at different physical locations by one or more physical devices. In some examples, communications manager 415 and/or at least some of its various sub-components may be a separate and distinct component in accordance with various aspects of the present disclosure. In other examples, communications manager 415 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Communications manager 415 may receive, at a base station, an uplink packet from a user equipment (UE), the base station located within a CN of a wireless communication system, identify an AI in the uplink packet, and route the uplink packet to a first gateway based on the AI, where the first gateway is external to the CN and has a local cache that stores data responsive to a data request included in the uplink packet.

Transmitter 420 may transmit signals generated by other components of the device. In some examples, the transmitter 420 may be collocated with a receiver 410 in a transceiver module. For example, the transmitter 420 may be an example of aspects of the transceiver 735 described with reference to FIG. 7. The transmitter 420 may utilize a single antenna or a set of antennas.

Figure 5:
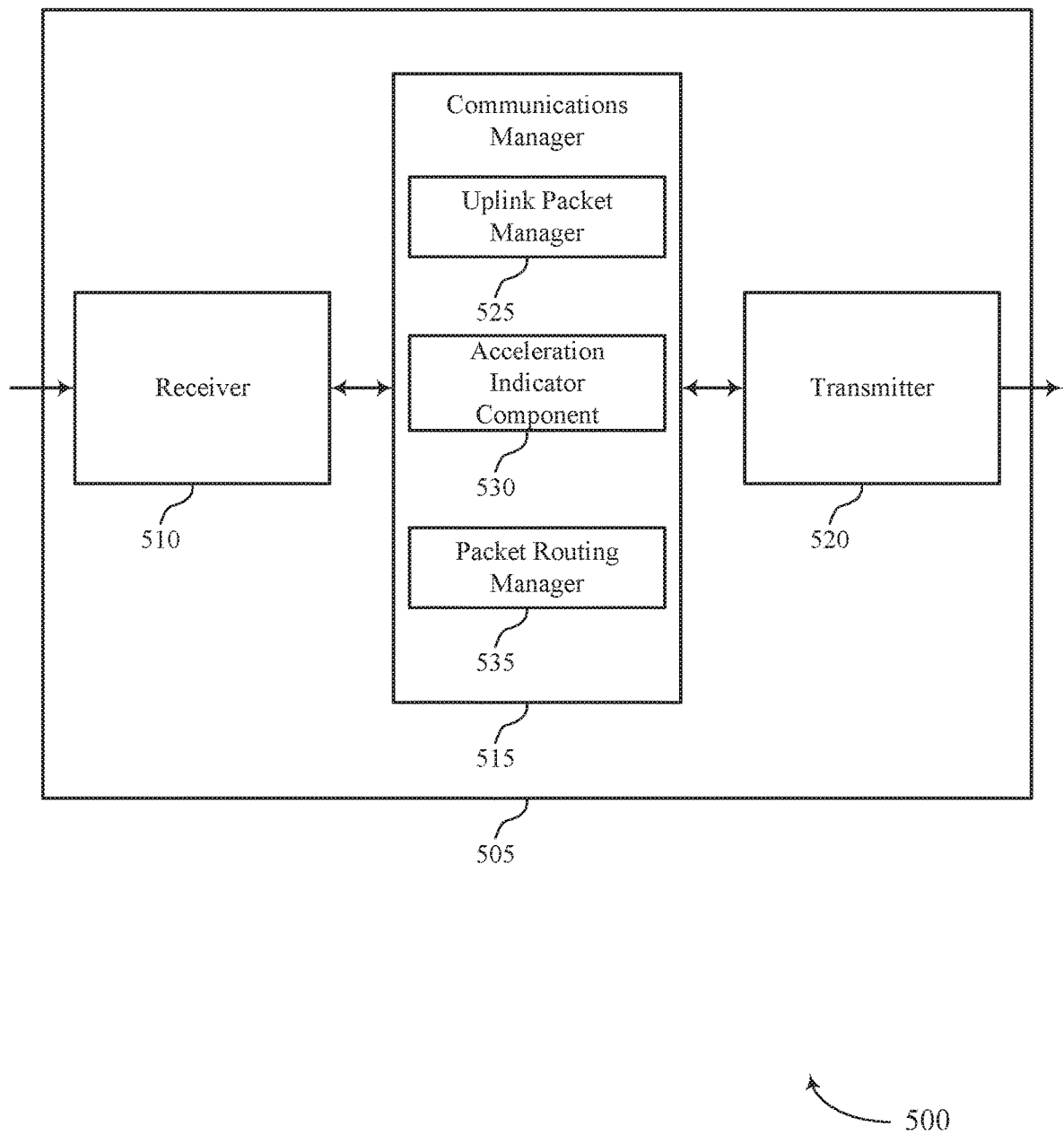

FIG. 5 shows a block diagram 500 of a wireless device 505 that supports user equipment assisted packet routing at a base station in accordance with aspects of the present disclosure. Wireless device 505 may be an example of aspects of a wireless device 405 or a base station 105 as described with reference to FIG. 4. Wireless device 505 may include receiver 510, communications manager 515, and transmitter 520. Wireless device 505 may also include a processor. Each of these components may be in communication with one another (e.g., via one or more buses).

Receiver 510 may receive information such as packets, user data, or control information associated with various information channels (e.g, control channels, data channels, and information related to user equipment assisted packet routing at a base station, etc.). Information may be passed on to other components of the device. The receiver 510 may be an example of aspects of the transceiver 735 described with reference to FIG. 7. The receiver 510 may utilize a single antenna or a set of antennas.

Communications manager 515 may be an example of aspects of the communications manager 715 described with reference to FIG. 7. Communications manager 515 may also include uplink packet manager 525, acceleration indicator component 530, and packet routing manager 535.

Uplink packet manager 525 may receive, at a base station, an uplink packet from a UE, the base station located within a CN of a wireless communication system.

Acceleration indicator component 530 may identify an AI in the uplink packet, identify that the first data service may be served by the local cache at the first gateway, and set the AI for the first data service to be reported by the UE to indicate that uplink packets of the UE associated with the first data service are to be routed to the first gateway. In some cases, the AI includes a bit field in the uplink packet that indicates the uplink packet is for a data service that is configured for local caching at the first gateway, or indicates a service type associated with the uplink packet.

Packet routing manager 535 may route the uplink packet to a first gateway based on the AI, where the first gateway is external to the CN and has a local cache that stores data responsive to a data request included in the uplink packet, or route the uplink packet according to an IP address contained in the uplink packet when the AI does not indicate that the uplink packet is to be routed to the local gateway. In some cases, packet routing manager 535 may generate a GTP-U packet based on information from the uplink packet, and route the GTP-U packet with the AI to the local cache. In some cases, the first gateway corresponds to a local UPF and the second gateway corresponds to a macro UPF. In some cases, the AI is included in a PDCP header of the uplink packet. In some cases, the first gateway is a local gateway having the local cache and where the AI indicates that the uplink packet is to be routed to the local gateway. In some cases, the first gateway corresponds to a TOF of the CN. In some cases, the AI is included in a radio link control (RLC) header or a media access control (MAC) CE of the uplink packet.

Transmitter 520 may transmit signals generated by other components of the device. In some examples, the transmitter 520 may be collocated with a receiver 510 in a transceiver module. For example, the transmitter 520 may be an example of aspects of the transceiver 735 described with reference to FIG. 7. The transmitter 520 may utilize a single antenna or a set of antennas.

Figure 6:
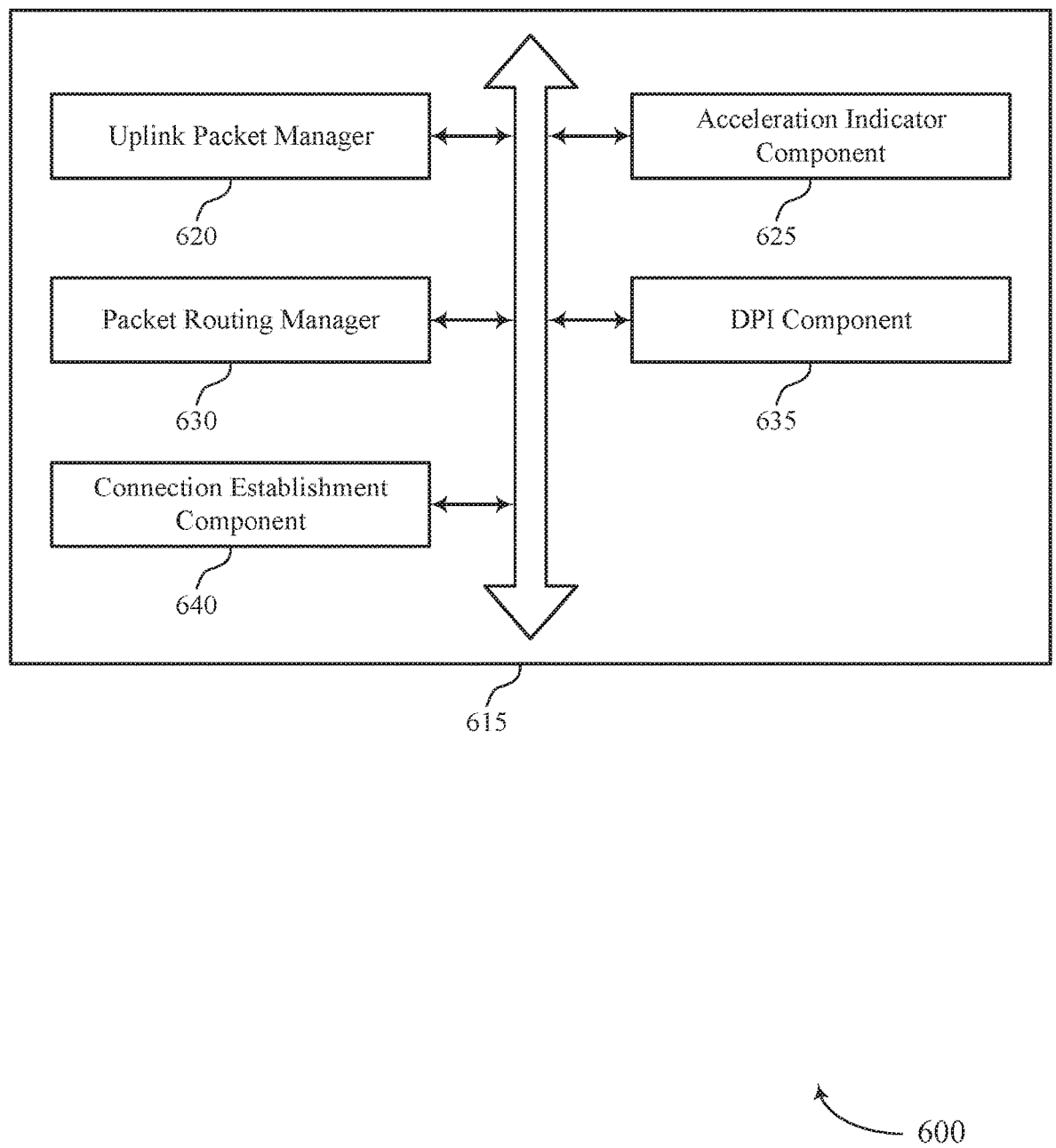

FIG. 6 shows a block diagram 600 of a communications manager 615 that supports user equipment assisted packet routing at a base station in accordance with aspects of the present disclosure. The communications manager 615 may be an example of aspects of a communications manager 415, a communications manager 515, or a communications manager 715 described with reference to FIGS. 4, 5, and 7. The communications manager 615 may include uplink packet manager 620, acceleration indicator component 625, packet routing manager 630, DPI component 635, and connection establishment component 640. Each of these modules may communicate, directly or indirectly, with one another (e.g., via one or more buses).

Uplink packet manager 620 may receive, at a base station, an uplink packet from a UE, the base station located within a CN of a wireless communication system.

Acceleration indicator component 625 may identify an AI in the uplink packet, identify that the first data service may be served by the local cache at the first gateway, and set the AI for the first data service to be reported by the UE to indicate that uplink packets of the UE associated with the first data service are to be routed to the first gateway. In some cases, the AI includes a bit field in the uplink packet that indicates the uplink packet is for a data service that is configured for local caching at the first gateway, or indicates a service type associated with the uplink packet.

Packet routing manager 630 may route the uplink packet to a first gateway based on the AI, where the first gateway is external to the CN and has a local cache that stores data responsive to a data request included in the uplink packet, or route the uplink packet according to an IP address contained in the uplink packet when the AI does not indicate that the uplink packet is to be routed to the local gateway. In some cases, packet routing manager 630 may generate a GTP-U packet based on information from the uplink packet, and route the GTP-U packet with the AI to the local cache. In some cases, the first gateway corresponds to a local UPF and the second gateway corresponds to a macro UPF. In some cases, the AI is included in a PDCP header of the uplink packet. In some cases, the first gateway is a local gateway having the local cache and where the AI indicates that the uplink packet is to be routed to the local gateway. In some cases, the first gateway corresponds to a TOF of the CN. In some cases, the AI is included in a radio link control (RLC) header or a media access control (MAC) CE of the uplink packet.

DPI component 635 may determine that an IP address or a TFT included in the uplink packet corresponds to an IP address or TFT associated with a CN cache located within the CN, transmit a content request based on information contained in the uplink packet to the CN cache, and perform DPI on the uplink packet. In some cases, the routing the uplink packet is based on a value of the AI and is performed independently of an IP address or a TFT included in the uplink packet. Connection establishment component 640 may establish a connection with the UE and configure a first data service at the UE.

Figure 7:
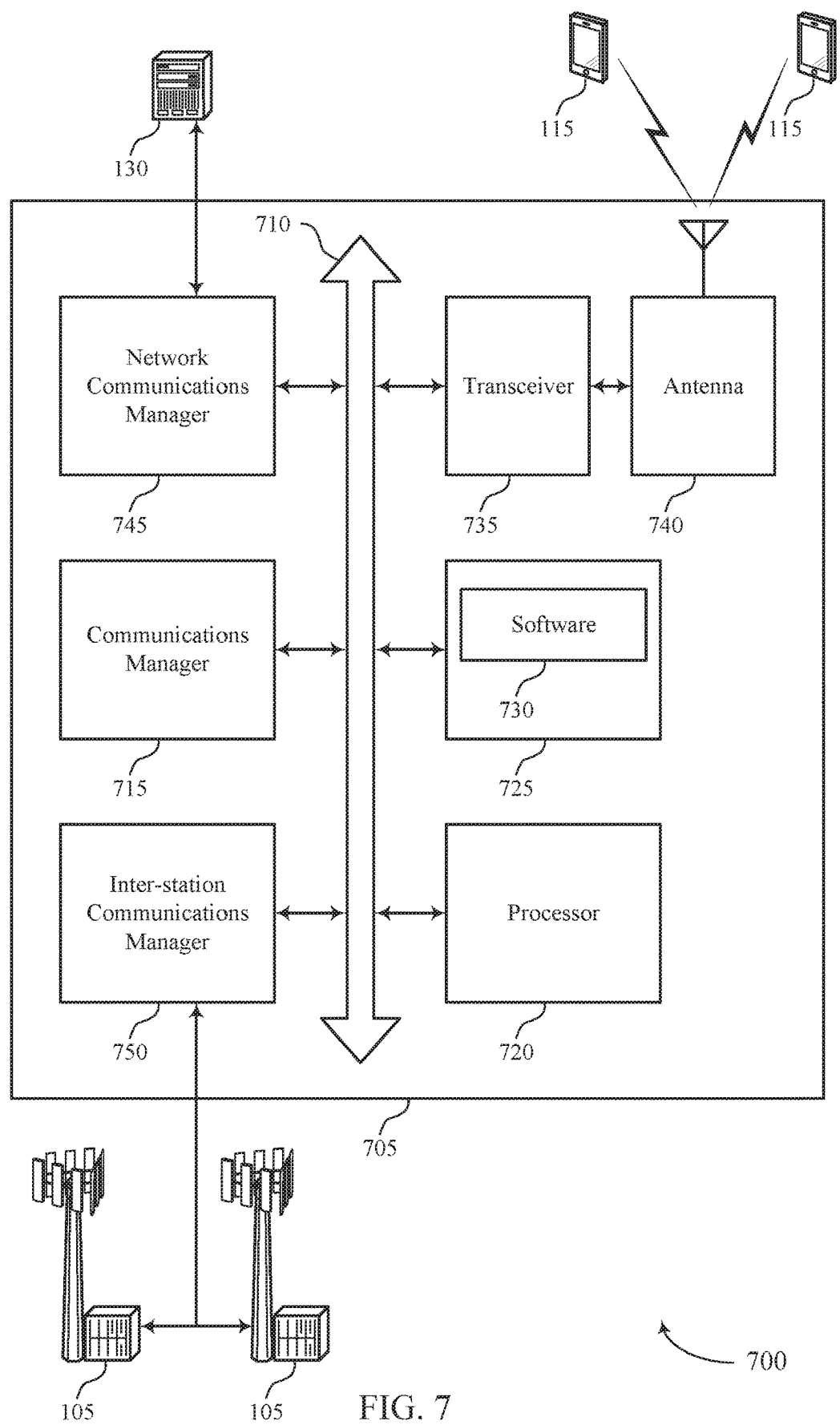
FIG. 7 illustrates a block diagram of a system including a base station that supports user equipment assisted packet routing at a base station in accordance with aspects of the present disclosure.

FIG. 7 shows a diagram of a system 700 including a device 705 that supports user equipment assisted packet routing at a base station in accordance with aspects of the present disclosure. Device 705 may be an example of or include the components of wireless device 405, wireless device 505, or a base station 105 as described above, e.g., with reference to FIGS. 4 and 5. Device 705 may include components for bi-directional voice and data communications including components for transmitting and receiving communications, including communications manager 715, processor 720, memory 725, software 730, transceiver 735, antenna 740, network communications manager 745, and inter-station communications manager 750. These components may be in electronic communication via one or more buses (e.g., bus 710). Device 705 may communicate wirelessly with one or more UEs 115.

Processor 720 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 720 may be configured to operate a memory array using a memory controller. In other cases, a memory controller may be integrated into processor 720. Processor 720 may be configured to execute computer-readable instructions stored in a memory to perform various functions (e.g., functions or tasks supporting user equipment assisted packet routing at a base station).

Memory 725 may include random access memory (RAM) and read only memory (ROM). The memory 725 may store computer-readable, computer-executable software 730 including instructions that, when executed, cause the processor to perform various functions described herein. In some cases, the memory 725 may contain, among other things, a basic input/output system (BIOS) which may control basic hardware or software operation such as the interaction with peripheral components or devices.

Software 730 may include code to implement aspects of the present disclosure, including code to support user equipment assisted packet routing at a base station. Software 730 may be stored in a non-transitory computer-readable medium such as system memory or other memory. In some cases, the software 730 may not be directly executable by the processor but may cause a computer (e.g., when compiled and executed) to perform functions described herein.

Transceiver 735 may communicate bi-directionally, via one or more antennas, wired, or wireless links as described above. For example, the transceiver 735 may represent a wireless transceiver and may communicate bi-directionally with another wireless transceiver. The transceiver 735 may also include a modem to modulate the packets and provide the modulated packets to the antennas for transmission, and to demodulate packets received from the antennas.

In some cases, the wireless device may include a single antenna 740. However, in some cases the device may have more than one antenna 740, which may be capable of concurrently transmitting or receiving multiple wireless transmissions.

Network communications manager 745 may manage communications with the core network (e.g, via one or more wired backhaul links). For example, the network communications manager 745 may manage the transfer of data communications for client devices, such as one or more UEs 115.

Inter-station communications manager 750 may manage communications with other base station 105, and may include a controller or scheduler for controlling communications with UEs 115 in cooperation with other base stations 105. For example, the inter-station communications manager 750 may coordinate scheduling for transmissions to UEs 115 for various interference mitigation techniques such as beamforming or joint transmission. In some examples, inter-station communications manager 750 may provide an X2 interface within an Long Term Evolution (LTE)/LTE-A wireless communication network technology to provide communication between base stations 105.

Figure 8:
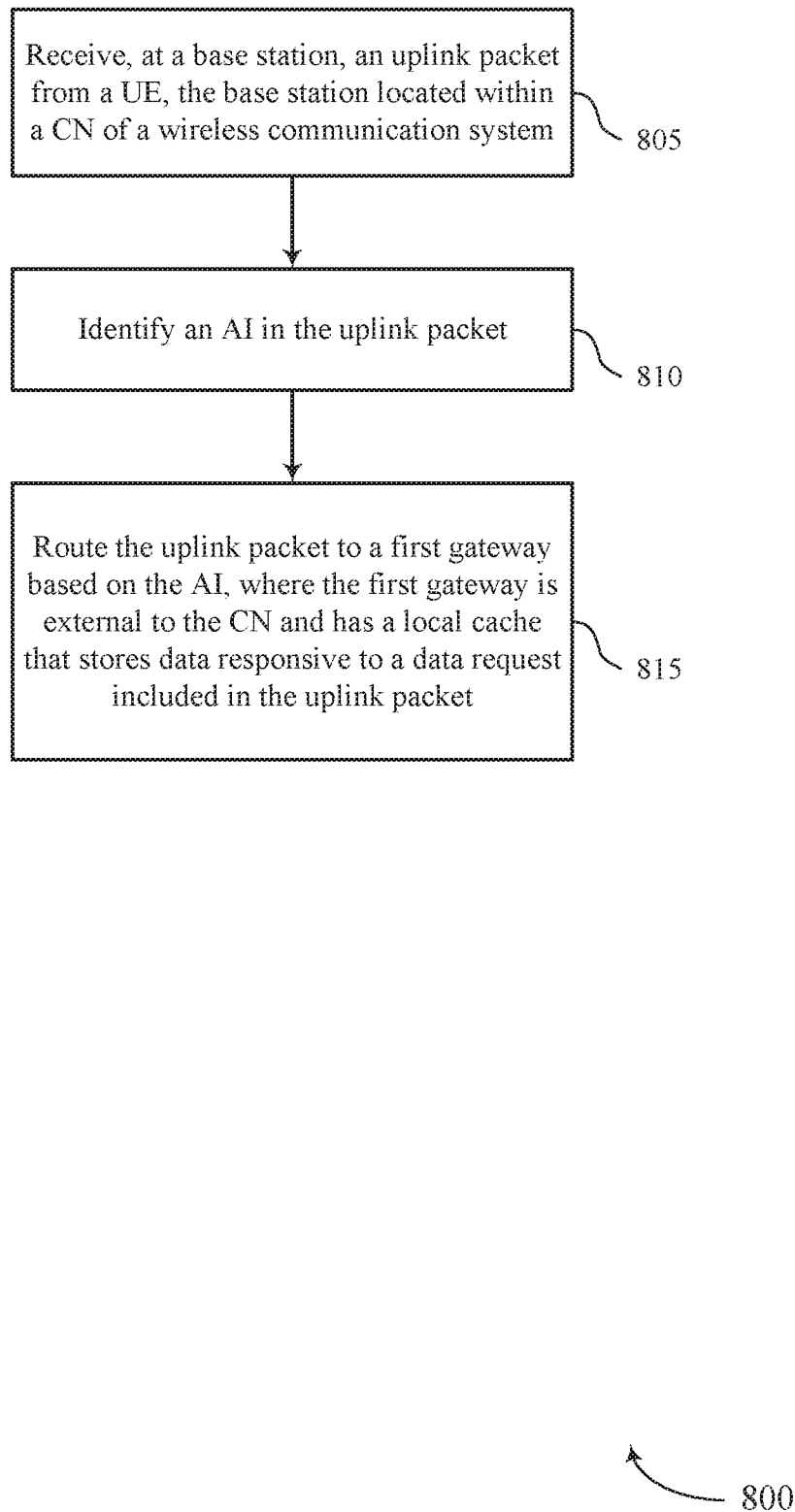
FIGS. 8 through 12 illustrate methods for user equipment assisted packet routing at a base station in accordance with aspects of the present disclosure.

FIG. 8 shows a flowchart illustrating a method 800 for user equipment assisted packet routing at a base station in accordance with aspects of the present disclosure. The operations of method 800 may be implemented by a base station 105 or its components as described herein. For example, the operations of method 800 may be performed by a communications manager as described with reference to FIGS. 4 through 7. In some examples, a base station 105 may execute a set of codes to control the functional elements of the device to perform the functions described below. Additionally or alternatively, the base station 105 may perform aspects of the functions described below using special-purpose hardware.

At block 805 the base station 105 may receive an uplink packet from a UE, the base station located within a CN of a wireless communication system. The operations of block 805 may be performed according to the methods described herein. In certain examples, aspects of the operations of block 805 may be performed by a uplink packet manager as described with reference to FIGS. 4 through 7.

At block 810 the base station 105 may identify an AI in the uplink packet. The operations of block 810 may be performed according to the methods described herein. In certain examples, aspects of the operations of block 810 may be performed by an acceleration indicator component as described with reference to FIGS. 4 through 7.

At block 815 the base station 105 may route the uplink packet to a first gateway based at least in part on the AI, wherein the first gateway is external to the CN and has a local cache that stores data responsive to a data request included in the uplink packet. The operations of block 815 may be performed according to the methods described herein. In certain examples, aspects of the operations of block 815 may be performed by a packet routing manager as described with reference to FIGS. 4 through 7.

Figure 9:
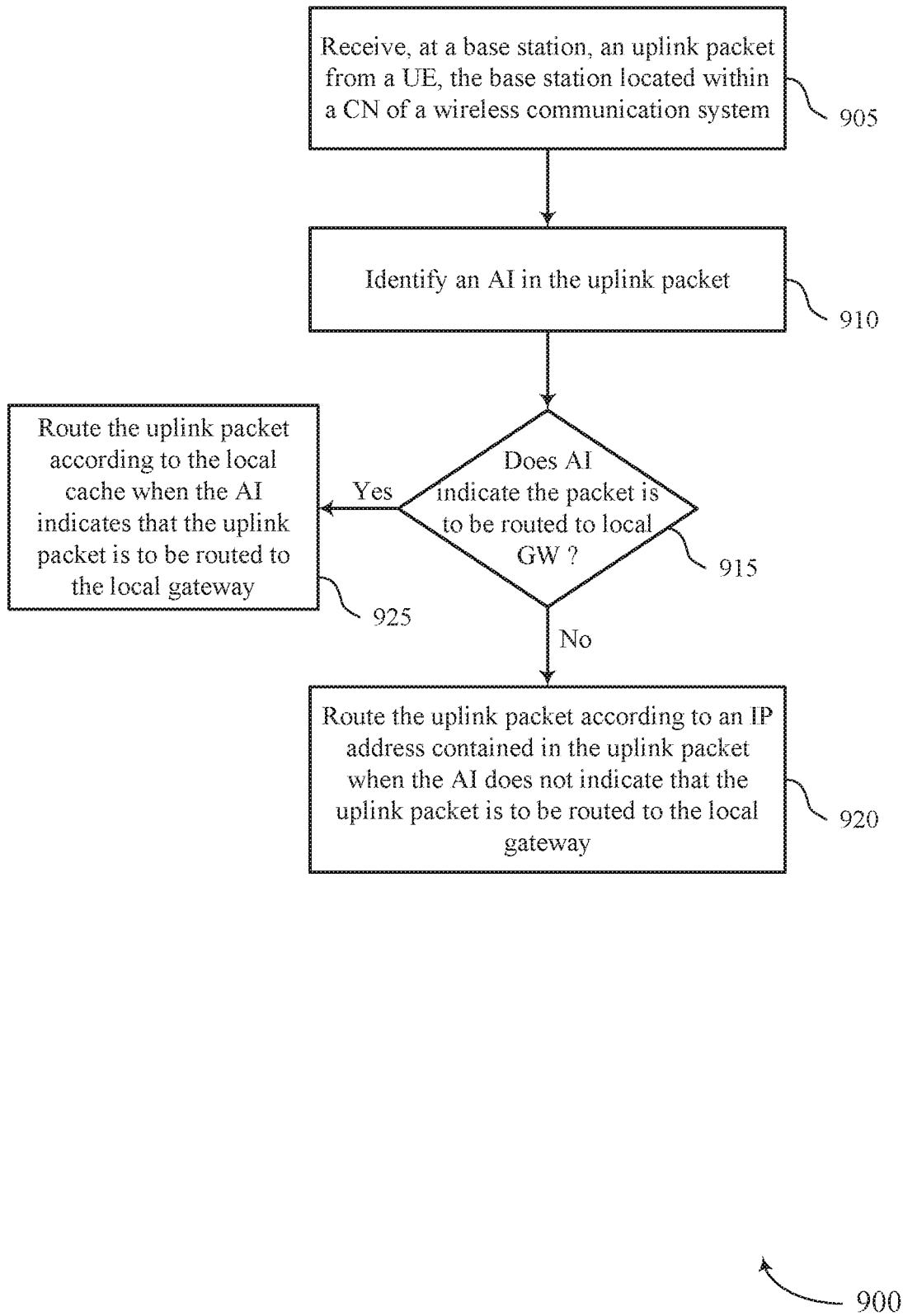

FIG. 9 shows a flowchart illustrating a method 900 for user equipment assisted packet routing at a base station in accordance with aspects of the present disclosure. The operations of method 900 may be implemented by a base station 105 or its components as described herein. For example, the operations of method 900 may be performed by a communications manager as described with reference to FIGS. 4 through 7. In some examples, a base station 105 may execute a set of codes to control the functional elements of the device to perform the functions described below. Additionally or alternatively, the base station 105 may perform aspects of the functions described below using special-purpose hardware.

At block 905 the base station 105 may receive an uplink packet from a UE, the base station located within a CN of a wireless communication system. The operations of block 905 may be performed according to the methods described herein. In certain examples, aspects of the operations of block 905 may be performed by a uplink packet manager as described with reference to FIGS. 4 through 7.

At block 910 the base station 105 may identify an AI in the uplink packet. The operations of block 910 may be performed according to the methods described herein. In certain examples, aspects of the operations of block 910 may be performed by an acceleration indicator component as described with reference to FIGS. 4 through 7.

At block 915 the base station 105 may determine if the AI indicates the packet is to be routed to a local gateway. The operations of block 915 may be performed according to the methods described herein. In certain examples, aspects of the operations of block 915 may be performed by a packet routing manager as described with reference to FIGS. 4 through 7.

At block 920, if the AI does not indicate the packet is to be routed to the local gateway, the base station 105 may route the uplink packet according to an IP address contained in the uplink packet when the AI does not indicate that the uplink packet is to be routed to the local gateway. The operations of block 920 may be performed according to the methods described herein. In certain examples, aspects of the operations of block 920 may be performed by a packet routing manager as described with reference to FIGS. 4 through 7.

At block 925, if the AI does indicate the packet is to be routed to the local gateway, the base station 105 may route the uplink packet according to the local cache when the AI indicates that the uplink packet is to be routed to the local gateway. The operations of block 925 may be performed according to the methods described herein. In certain examples, aspects of the operations of block 925 may be performed by a packet routing manager as described with reference to FIGS. 4 through 7.

Figure 10:
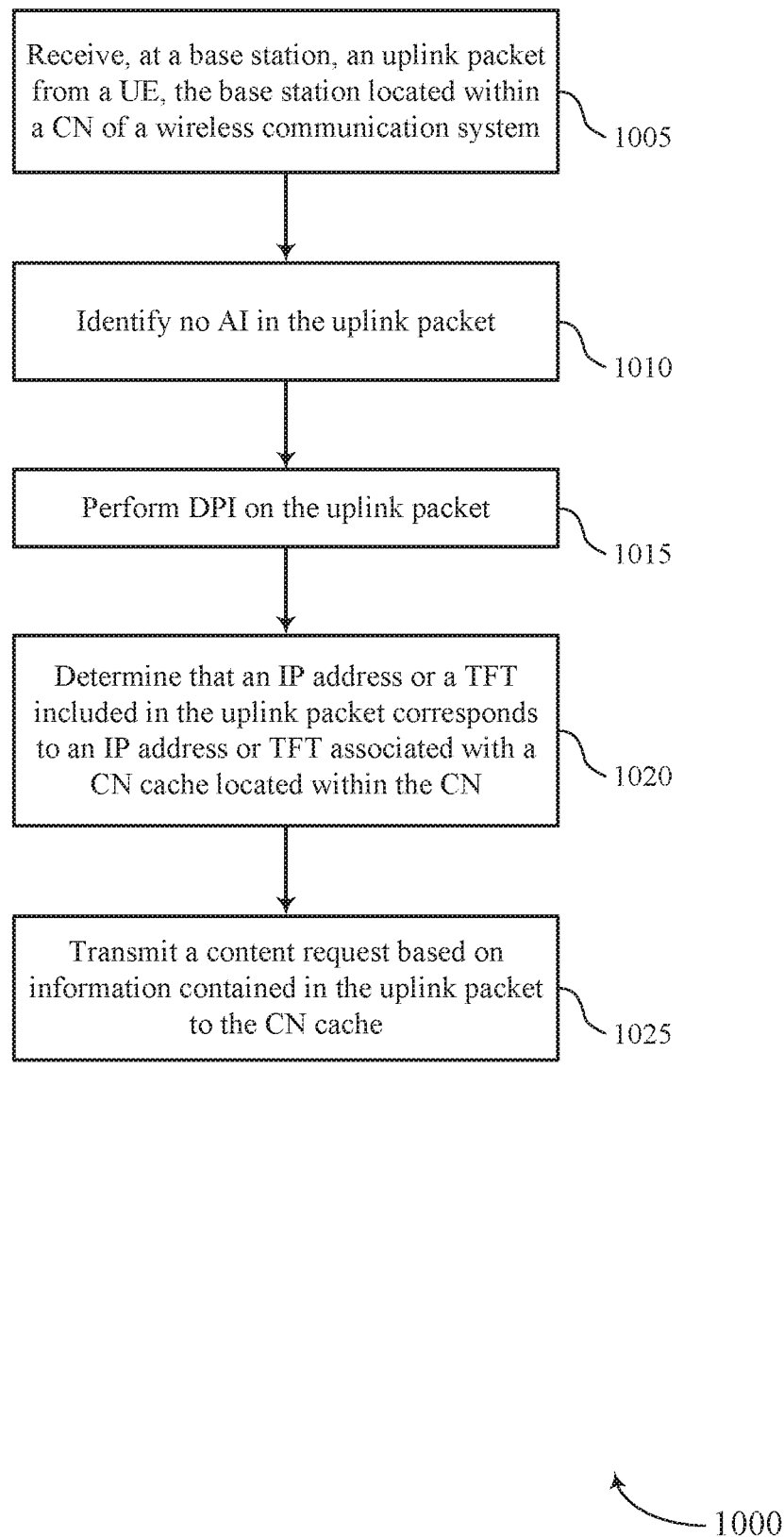

FIG. 10 shows a flowchart illustrating a method 1000 for user equipment assisted packet routing at a base station in accordance with aspects of the present disclosure. The operations of method 1000 may be implemented by a base station 105 or its components as described herein. For example, the operations of method 1000 may be performed by a communications manager as described with reference to FIGS. 4 through 7. In some examples, a base station 105 may execute a set of codes to control the functional elements of the device to perform the functions described below. Additionally or alternatively, the base station 105 may perform aspects of the functions described below using special-purpose hardware.

At block 1005 the base station 105 may receive an uplink packet from a UE, the base station located within a CN of a wireless communication system. The operations of block 1005 may be performed according to the methods described herein. In certain examples, aspects of the operations of block 1005 may be performed by a uplink packet manager as described with reference to FIGS. 4 through 7.

At block 1010 the base station 105 may identify an AI in the uplink packet. The operations of block 1010 may be performed according to the methods described herein. In certain examples, aspects of the operations of block 1010 may be performed by an acceleration indicator component as described with reference to FIGS. 4 through 7.

At block 1015 the base station 105 may perform DPI on the packet. The operations of block 1015 may be performed according to the methods described herein. In certain examples, aspects of the operations of block 1015 may be performed by a DPI component as described with reference to FIGS. 4 through 7.

At block 1020 the base station 105 may determine that an IP address or a TFT included in the uplink packet corresponds to an IP address or TFT associated with a CN cache located within the CN. The operations of block 1020 may be performed according to the methods described herein. In certain examples, aspects of the operations of block 1020 may be performed by a DPI component as described with reference to FIGS. 4 through 7.

At block 1025 the base station 105 may transmit a content request based at least in part on information contained in the uplink packet to the CN cache. The operations of block 1025 may be performed according to the methods described herein. In certain examples, aspects of the operations of block 1025 may be performed by a DPI component as described with reference to FIGS. 4 through 7.

Figure 11:
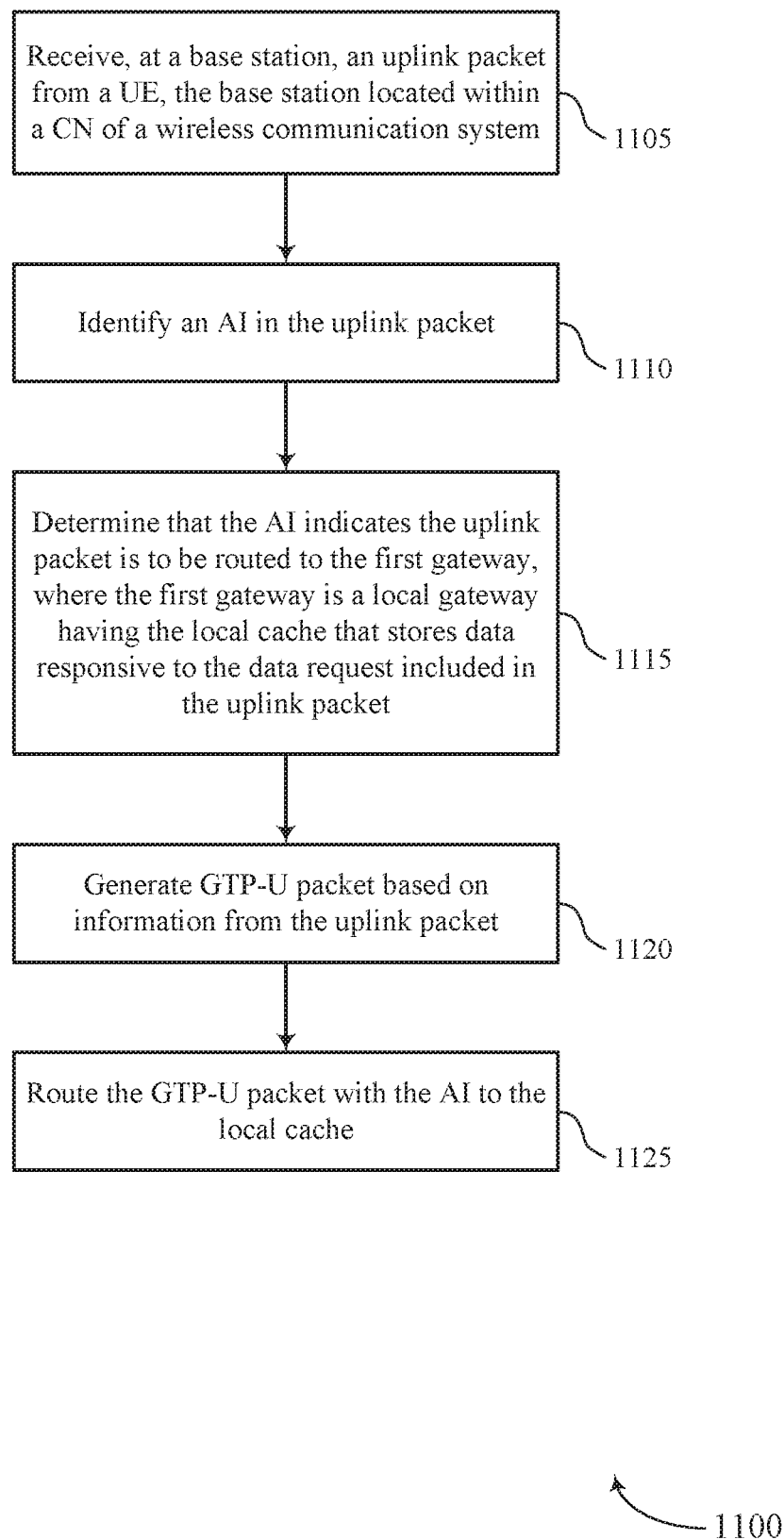

FIG. 11 shows a flowchart illustrating a method 1100 for user equipment assisted packet routing at a base station in accordance with aspects of the present disclosure. The operations of method 1100 may be implemented by a base station 105 or its components as described herein. For example, the operations of method 1100 may be performed by a communications manager as described with reference to FIGS. 4 through 7. In some examples, a base station 105 may execute a set of codes to control the functional elements of the device to perform the functions described below. Additionally or alternatively, the base station 105 may perform aspects of the functions described below using special-purpose hardware.

At block 1105 the base station 105 may receive an uplink packet from a UE, the base station located within a CN of a wireless communication system. The operations of block 1105 may be performed according to the methods described herein. In certain examples, aspects of the operations of block 1105 may be performed by a uplink packet manager as described with reference to FIGS. 4 through 7.

At block 1110 the base station 105 may identify an AI in the uplink packet. The operations of block 1110 may be performed according to the methods described herein. In certain examples, aspects of the operations of block 1110 may be performed by art acceleration indicator component as described with reference to FIGS. 4 through 7.

At block 1115 the base station 105 may determine that the AI indicates the uplink packet is to be routed to the first gateway, wherein the first gateway is a local gateway having the local cache that stores data responsive to the data request included in the uplink packet. The operations of block 1115 may be performed according to the methods described herein. In certain examples, aspects of the operations of block 1115 may be performed by a packet routing manager as described with reference to FIGS. 4 through 7.

At block 1120 the base station 105 may generate GTP-U packet based at least in part on information from the uplink packet. The operations of block 1120 may be performed according to the methods described herein. In certain examples, aspects of the operations of block 1120 may be performed by a packet routing manager as described with reference to FIGS. 4 through 7.

At block 1125 the base station 105 may route the GTP-U packet with the AI to the local cache. The operations of block 1125 may be performed according to the methods described herein. In certain examples, aspects of the operations of block 1125 may be performed by a packet routing manager as described with reference to FIGS. 4 through 7.

Figure 12:
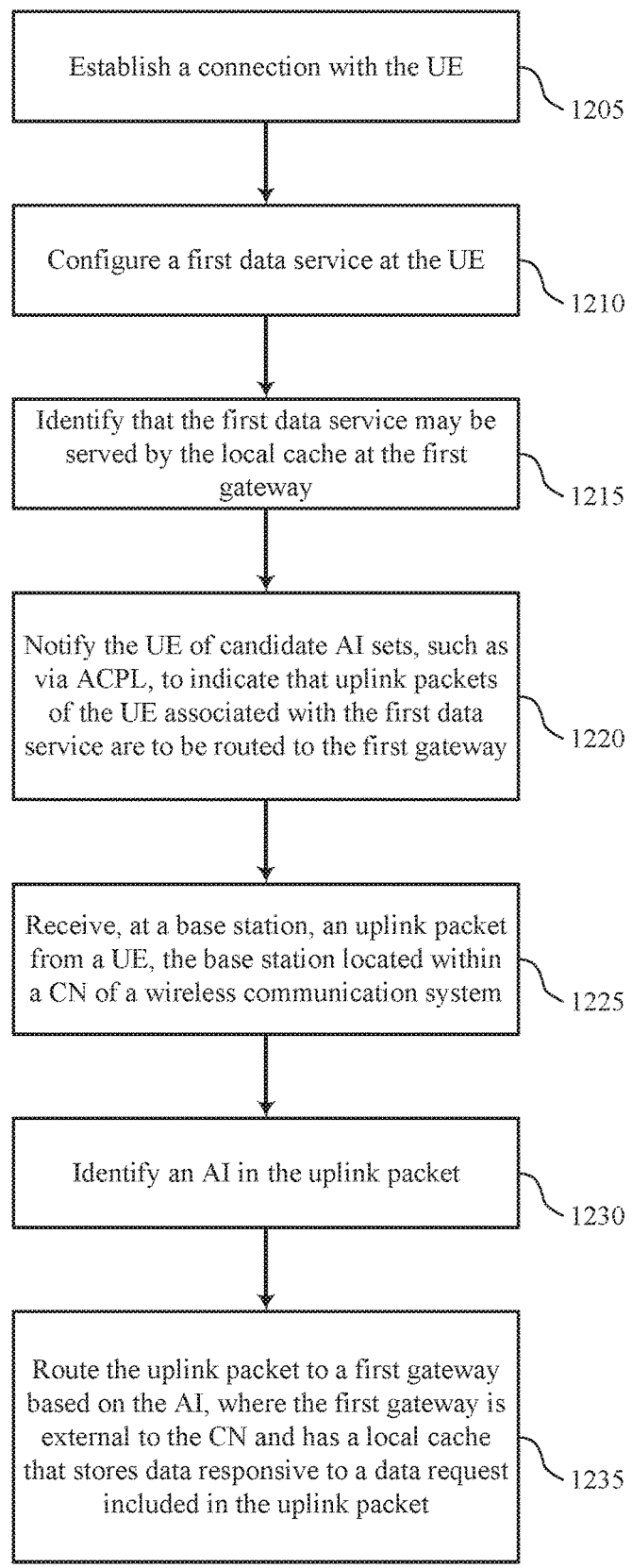

FIG. 12 shows a flowchart illustrating a method 1200 for user equipment assisted packet routing at a base station in accordance with aspects of the present disclosure. The operations of method 1200 may be implemented by a base station 105 or its components as described herein. For example, the operations of method 1200 may be performed by a communications manager as described with reference to FIGS. 4 through 7. In some examples, a base station 105 may execute a set of codes to control the functional elements of the device to perform the functions described below.

Additionally or alternatively, the base station 105 may perform aspects of the functions described below using special-purpose hardware.

At block 1205 the base station 105 may establish a connection with the UE. The operations of block 1205 may be performed according to the methods described herein. In certain examples, aspects of the operations of block 1205 may be performed by a connection establishment component as described with reference to FIGS. 4 through 7.

At block 1210 the base station 105 may configure a first data service at the UE. The operations of block 1210 may be performed according to the methods described herein. In certain examples, aspects of the operations of block 1210 may be performed by a connection establishment component as described with reference to FIGS. 4 through 7.

At block 1215 the base station 105 may identify that the first data service may be served by the local cache at the first gateway. The operations of block 1215 may be performed according to the methods described herein. In certain examples, aspects of the operations of block 1215 may be performed by an acceleration indicator component as described with reference to FIGS. 4 through 7.

At block 1220 the base station 105 may notify the UE of candidate AI sets, such as via ACPL, to indicate that uplink packets of the UE associated with the first data service are to be routed to the first gateway. The operations of block 1220 may be performed according to the methods described herein. In certain examples, aspects of the operations of block 1220 may be performed by an acceleration indicator component as described with reference to FIGS. 4 through 7.

At block 1225 the base station 105 may receive an uplink packet from a UE, the base station located within a CN of a wireless communication system. The operations of block 1225 may be performed according to the methods described herein. In certain examples, aspects of the operations of block 1225 may be performed by a uplink packet manager as described with reference to FIGS. 4 through 7.

At block 1230 the base station 105 may identify an AI in the uplink packet. The operations of block 1230 may be performed according to the methods described herein. In certain examples, aspects of the operations of block 1230 may be performed by an acceleration indicator component as described with reference to FIGS. 4 through 7.

At block 1235 the base station 105 may route the uplink packet to a first gateway based at least in part on the AI, wherein the first gateway is external to the CN and has a local cache that stores data responsive to a data request included in the uplink packet. The operations of block 1235 may be performed according to the methods described herein. In certain examples, aspects of the operations of block 1235 may be performed by a packet routing manager as described with reference to FIGS. 4 through 7.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of eNBs provide coverage for various geographical regions. For example, each eNB, next generation NodeB (gNB), or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), gNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
receiving, at a base station, an uplink packet from a user equipment (UE), the base station located within a core network (CN) of a wireless communication system;
identifying an acceleration indicator (AI) in the uplink packet; and
routing the uplink packet to a first gateway based at least in part on a value of the AI, wherein the first gateway is external to the CN and has a local cache that stores data responsive to a data request included in the uplink packet, and wherein the routing is performed independently of an Internet Protocol (IP) address or a traffic flow template (TFT) included in the uplink packet.

2. The method of claim 1, wherein:
the first gateway is a local gateway having the local cache and wherein the AI indicates that the uplink packet is to be routed to the local gateway.

3. The method of claim 1, further comprising:
determining that an Internet Protocol (IP) address or a traffic flow template (TFT) included in the uplink packet corresponds to an IP address or TFT associated with a CN cache located within the CN; and
transmitting a content request based at least in part on information contained in the uplink packet to the CN cache.

4. The method of claim 1, wherein:
the AI is included in a packet data convergence protocol (PDCP) header of the uplink packet.

5. The method of claim 1, wherein:
wherein the AI is included in a radio link control (RLC) header or a medium access control (MAC) control element (CE) of the uplink packet.

6. The method of claim 1, wherein:
the AI comprises a bit field in the uplink packet that indicates the uplink packet is for a data service that is configured for local caching at the first gateway, or indicates a service type associated with the uplink packet.

7. The method of claim 1, wherein the routing the uplink packet comprises:
determining that the AI indicates the uplink packet is to be routed to the first gateway, wherein the first gateway is a local gateway having the local cache;
generating a general packet radio service (GPRS) tunneling protocol user plane (GTP-U) packet based at least in part on information from the uplink packet; and
routing the GTP-U packet with the AI to the local cache.

8. The method of claim 1, wherein:
wherein the first gateway corresponds to a traffic offload function (TOF) of the CN.

9. The method of claim 1, wherein:
wherein the first gateway corresponds to a local user plane function (UPF) and a different gateway corresponds to a macro UPF.

10. An apparatus for wireless communication, comprising:
means for receiving, at a base station, an uplink packet from a user equipment (UE), the base station located within a core network (CN) of a wireless communication system;
means for identifying an acceleration indicator (AI) in the uplink packet; and
means for routing the uplink packet to a first gateway based at least in part on a value of the AI, wherein the first gateway is external to the CN and has a local cache that stores data responsive to a data request included in the uplink packet, and wherein the routing is performed independently of an Internet Protocol (IP) address or a traffic flow template (TFT) included in the uplink packet.

11. The apparatus of claim 10, wherein:
the first gateway is a local gateway having the local cache and wherein the AI indicates that the uplink packet is to be routed to the local gateway.

12. The apparatus of claim 10, further comprising:
means for determining that an Internet Protocol (IP) address or a traffic flow template (TFT) included in the uplink packet corresponds to an IP address or TFT associated with a CN cache located within the CN; and
means for transmitting a content request based at least in part on information contained in the uplink packet to the CN cache.

13. The apparatus of claim 10, wherein:
the AI is included in a packet data convergence protocol (PDCP) header of the uplink packet.

14. The apparatus of claim 11, wherein:
the AI comprises a bit field in the uplink packet that indicates the uplink packet is for a data service that is configured for local caching at the first gateway, or indicates a service type associated with the uplink packet.

15. The apparatus of claim 10, further comprising:
means for determining that the AI indicates the uplink packet is to be routed to the first gateway, wherein the first gateway is a local gateway having the local cache that stores data responsive to the data request included in the uplink packet;
means for generating a general packet radio service (GPRS) tunneling protocol user plane (GTP-U) packet based at least in part on information from the uplink packet; and
means for routing the GTP-U packet with the AI to the local cache.

16. The apparatus of claim 10, wherein:
the first gateway corresponds to a local user plane function (UPF) and a different gateway corresponds to a macro UPF.

17. An apparatus for wireless communication, comprising:
a processor;
memory in electronic communication with the processor; and
instructions stored in the memory and operable, when executed by the processor, to cause the apparatus to:
receive, at a base station, an uplink packet from a user equipment (UE), the base station located within a core network (CN) of a wireless communication system;
identify an acceleration indicator (AI) in the uplink packet; and
route the uplink packet to a first gateway based at least in part on a value of the AI, wherein the first gateway is external to the CN and has a local cache that stores data responsive to a data request included in the uplink packet, and wherein the routing is performed independently of an Internet Protocol (IP) address or a traffic flow template (TFT) included in the uplink packet.

18. The apparatus of claim 17, wherein:
the first gateway is a local gateway having the local cache and wherein the AI indicates that the uplink packet is to be routed to the local gateway.

19. The apparatus of claim 17, wherein the instructions are further executable by the processor to:
- determine that an Internet Protocol (IP) address or a traffic flow template (TFT) included in the uplink packet corresponds to an IP address or TFT associated with a CN cache located within the CN; and
- transmit a content request based at least in part on information contained in the uplink packet to the CN cache.

20. The apparatus of claim 17, wherein:
the AI is included in a packet data convergence protocol (PDCP) header of the uplink packet.

21. The apparatus of claim 17, wherein:
the AI comprises a bit field in the uplink packet that indicates the uplink packet is for a data service that is configured for local caching at the first gateway, or indicates a service type associated with the uplink packet.

22. The apparatus of claim 17, wherein the instructions are further executable by the processor to:
- determine that the AI indicates the uplink packet is to be routed to the first gateway, wherein the first gateway is a local gateway having the local cache that stores data responsive to the data request included in the uplink packet;
- generate a general packet radio service (GPRS) tunneling protocol user plane (GTP-U) packet based at least in part on information from the uplink packet; and
- route the GTP-U packet with the AI to the local cache.

23. The apparatus of claim 17, wherein:
the first gateway corresponds to a local user plane function (UPF) and a different gateway corresponds to a macro UPF.

24. A non-transitory computer readable medium storing code for wireless communication, the code comprising instructions executable by a processor to:
- receive, at a base station, an uplink packet from a user equipment (UE), the base station located within a core network (CN) of a wireless communication system;
- identify an acceleration indicator (AI) in the uplink packet; and
- route the uplink packet to a first gateway based at least in part on a value of the AI, wherein the first gateway is external to the CN and has a local cache that stores data responsive to a data request included in the uplink packet, and wherein the routing is performed independently of an Internet Protocol (IP) address or a traffic flow template (TFT) included in the uplink packet.

25. The non-transitory computer-readable medium of claim 24, wherein:
the first gateway is a local gateway having the local cache and wherein the AI indicates that the uplink packet is to be routed to the local gateway.

26. The non-transitory computer-readable medium of claim 24, wherein the instructions are further executable by the processor to:
- determine that an Internet Protocol (IP) address or a traffic flow template (TFT) included in the uplink packet corresponds to an IP address or TFT associated with a CN cache located within the CN; and
- transmit a content request based at least in part on information contained in the uplink packet to the CN cache.

27. The non-transitory computer-readable medium of claim 24, wherein:
the AI is included in a packet data convergence protocol (PDCP) header of the uplink packet.

28. The non-transitory computer-readable medium of claim 24, wherein:
the AI comprises a bit field in the uplink packet that indicates the uplink packet is for a data service that is configured for local caching at the first gateway, or indicates a service type associated with the uplink packet.

29. The non-transitory computer-readable medium of claim 24, wherein the instructions are further executable by the processor to:
- determine that the AI indicates the uplink packet is to be routed to the first gateway, wherein the first gateway is a local gateway having the local cache that stores data responsive to the data request included in the uplink packet;
- generate a general packet radio service (GPRS) tunneling protocol user plane (GTP-U) packet based at least in part on information from the uplink packet; and
- route the GTP-U packet with the AI to the local cache.

* * * * *